No. 824,792. PATENTED JULY 3, 1906.
T. W. JERREMS.
GRASS TWINE MACHINE.
APPLICATION FILED OCT. 22, 1904.

4 SHEETS—SHEET 1.

No. 824,792. PATENTED JULY 3, 1906.
T. W. JERREMS.
GRASS TWINE MACHINE.
APPLICATION FILED OCT. 22, 1904.

4 SHEETS—SHEET 2.

Witnesses.
E. W. Jeppesen.
A. H. Opsahl.

Inventor.
Thomas W. Jerrems.
By his Attorneys.
Williamson & Merchant

No. 824,792. PATENTED JULY 3, 1906.
T. W. JERREMS.
GRASS TWINE MACHINE.
APPLICATION FILED OCT. 22, 1904.

4 SHEETS—SHEET 3.

No. 824,792. PATENTED JULY 3, 1906.
T. W. JERREMS.
GRASS TWINE MACHINE.
APPLICATION FILED OCT. 22, 1904.
4 SHEETS—SHEET 4.
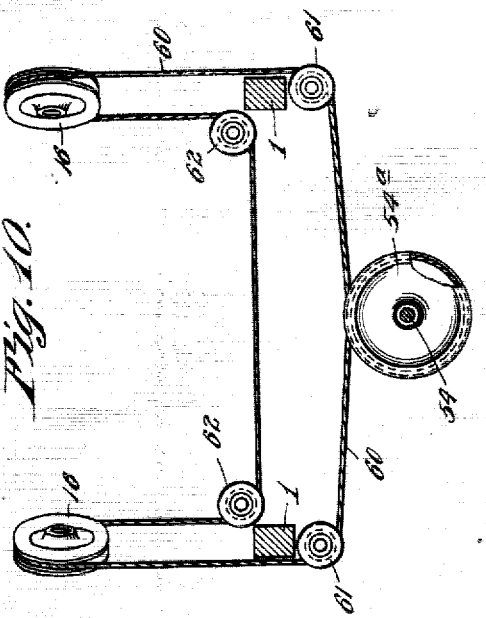
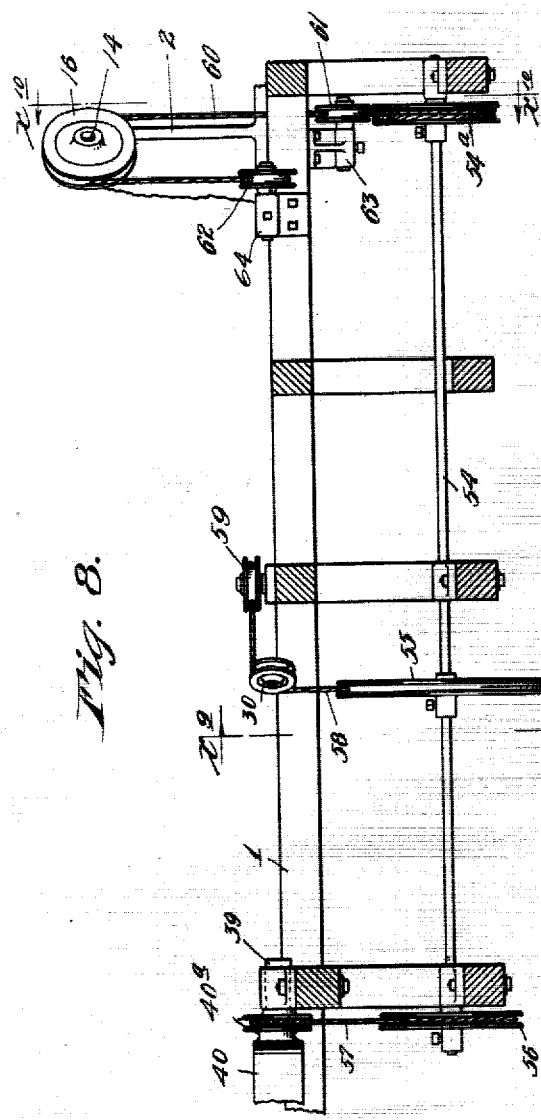
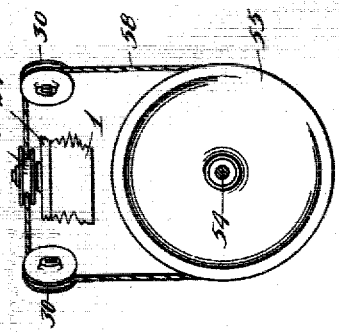
Witnesses.
G. W. Jeppsen.
A. H. Opsahl.
Inventor:
Thomas W. Jerrems.
By his Attorneys.
Williamson Merchant

UNITED STATES PATENT OFFICE.

THOMAS W. JERREMS, OF ST. PAUL, MINNESOTA.

GRASS-TWINE MACHINE.

No. 824,792. Specification of Letters Patent. Patented July 3, 1906.

Application filed October 22, 1904. Serial No. 229,549.

*To all whom it may concern:*

Be it known that I, THOMAS W. JERREMS, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

My present invention relates to machines for making grass twine, and has for its object to improve such machines in point of simplicity, efficiency, durability, amount of space occupied, and amount of labor required to operate the machine and maintain the same in operative condition.

To the above ends the invention consists of the novel devices and combinations of devices hereinafter described, and defined in the claims.

The improved machine is illustrated in the accompanying drawings, wherein like characters indicate like parts throughout the several views.

Figure 1:
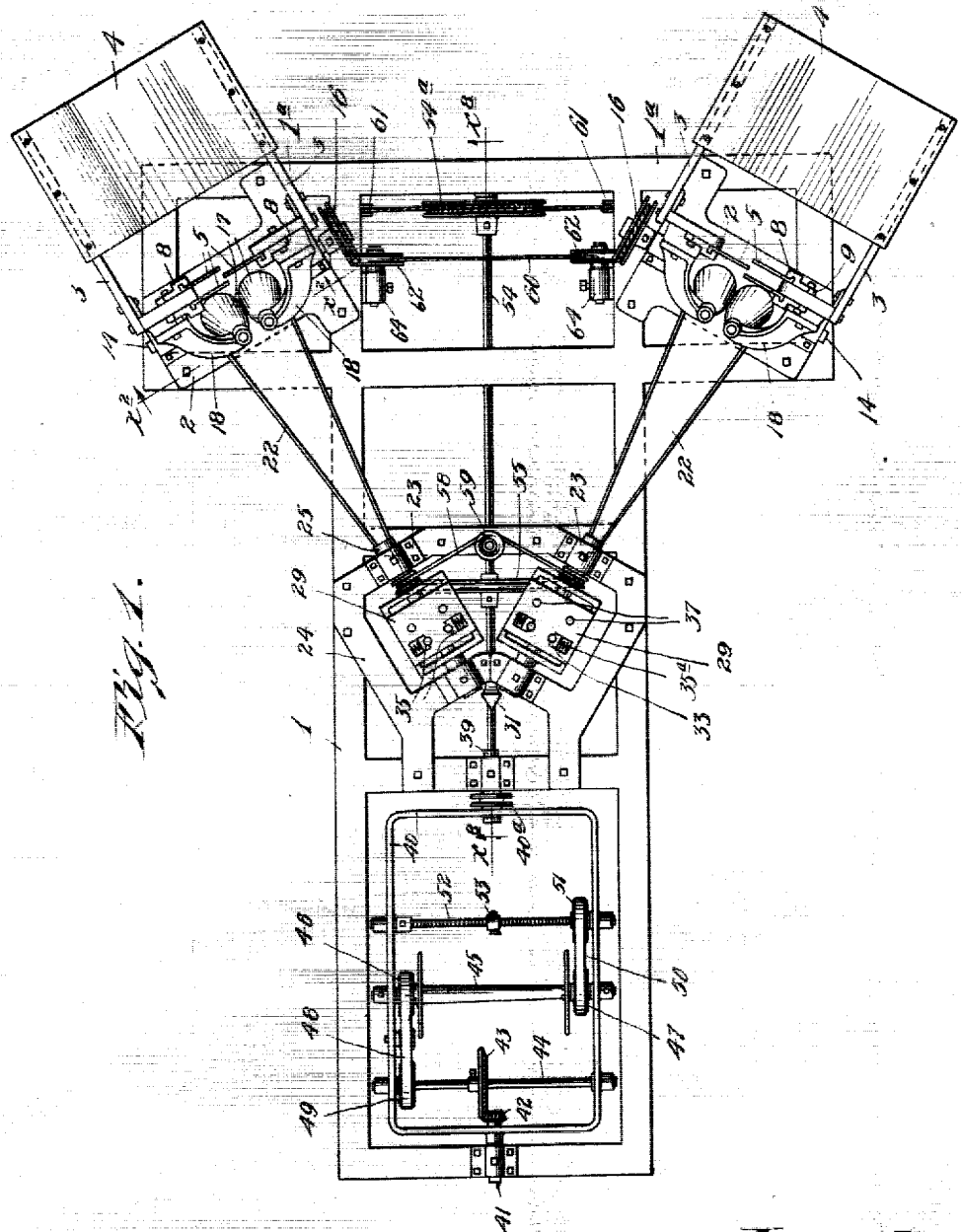
Figure 2:
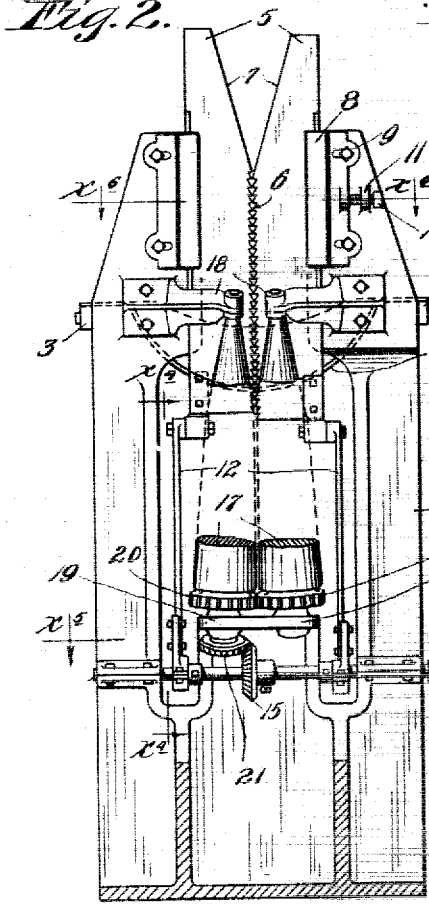
Figure 3:
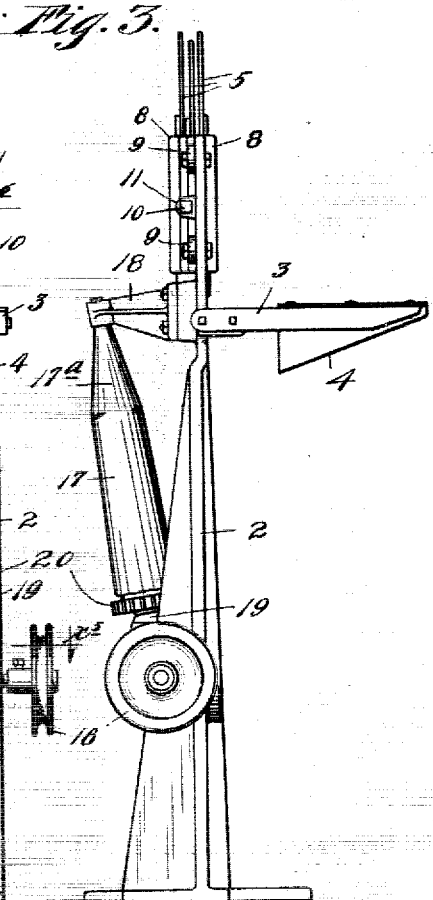
Figure 4:
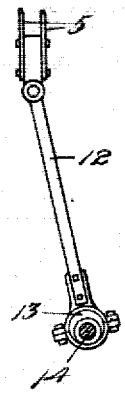
Figure 5:
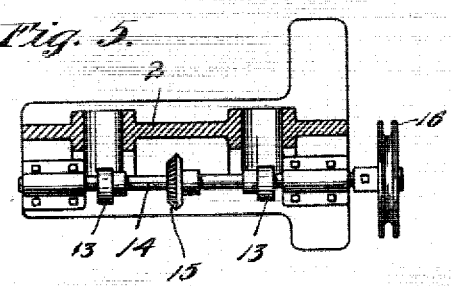
Figure 6:
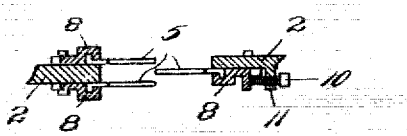
Figure 7:
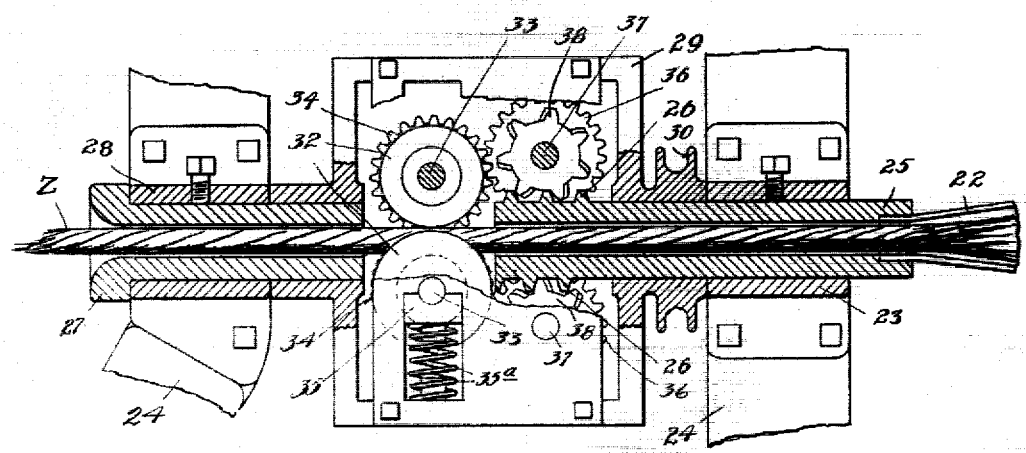

Referring to the drawings, Figure 1 is a plan view of the complete machine. Fig. 2 is a transverse vertical section taken approximately on the line $x^2 \, x^2$ of Fig. 1, some parts being broken away. Fig. 3 is a side elevation of the parts shown in Fig. 2. Fig. 4 is a detail in section on the line $x^4 \, x^4$ of Fig. 2. Fig. 5 is a horizontal section on the line $x^5 \, x^5$ of Fig. 2. Fig. 6 is a horizontal section on the line $x^6 \, x^6$ of Fig. 2. Fig. 7 is a view chiefly in horizontal section, but with some parts in full, illustrating the construction of one of the twisting devices. Fig. 8 is a vertical longitudinal section on the line $x^8 \, x^8$ of Fig. 1, some parts being removed and some parts being broken away. Fig. 9 is a transverse section on the line $x^9 \, x^9$ of Fig. 8, and Fig. 10 is a transverse vertical section on the line $x^{10} \, x^{10}$ of Fig. 8.

The numeral 1 indicates an elongated skeleton frame which, as shown, is transversely extended at one end, as indicated at 1ᵃ.

Rigidly secured on the lateral extensions 1ᵃ of the frame 1 is a pair of upright bifurcated bearing-pedestals 2, which are set at an oblique angle to each other. Rigidly secured to the upper portions of the pedestals 2, as shown, by means of bars 3 are concave plates or hoppers 4, which afford grass-holders that stand forward of the said pedestals.

In this machine I employ what may be conveniently designated as "primary feed devices" or "selectors" and "secondary feed devices," the former of which operate to feed the grass laterally downward from the holder and the latter of which receive the grass-blades from said primary feed devices and feed the same endwise in a regular order of succession to the twine-forming mechanism. The primary feed devices are of the general form and construction disclosed and broadly claimed in my prior patent, No. 745,625, issued of date December 1, 1903, entitled "Machine for making grass twine." The secondary feed device is made up of a pair of upright rollers having coöperating surfaces that diverge from each other and cause the grass to be fed between the rollers by downward lateral movement.

*Feed mechanism.*—The numeral 5 indicates a group of three vertically-disposed feed blades or bars having serrated inner edges 6 and upwardly-diverging edge surfaces 7 above said serrations. At one side two of the feed-blades 5 are located parallel to each other, but are spaced apart laterally, while the one coöperating blade on the other side is so located that it works in a plane passing between the coöperating blades on the other side, as best shown in Fig. 6. The coöperating inclined edges 7 of the said blades form an upwardly-diverging crotch which leads downward to the said serrations 6 of the feed-blades and is adapted to receive the butt-ends of the grass-blades, which are held in a loose bundle or bunch by the holder 4. The feed-blades 5 are guided for true vertical movements by adjustable guide-boxes 8, which, as shown, are secured to the pedestal 2 by slot-and-screw connections 9. One of the guide-boxes 8 is subject to a set-screw 10, which works through a lug 11 in one prong of the pedestal and impinges against the said guide-box. By adjustments of the one guide with respect to the other the distance which the opposing serrations of the feed-bars will interlap may be varied, and the rate of feed of the grass-blades may be regulated accordingly. The lower ends of the feed-blades 5 are connected by crank-rods 12 to cranks or eccentrics 13, carried by a counter-shaft 14, journaled in suitable bearings on the pedestal 2. The two cranks or eccentrics 13 are set one hundred and eighty degrees apart, so that the blades on one side will be moved upward while the blade on the other side will be moving downward. The shaft 14 carries a bevel-pinion 15 and grooved pulley or sheave 16. The said cranks 13 have short throw, usually about one-half of an inch. The two blades 5 which stand side by side are tied together and connected for common movements to the same crank-rod 12.

The upright rollers which constitute the secondary feed device are designated by the numeral 17, and their coöperating crotch-forming surfaces 17ª are formed at their upper ends by turning the said rollers conical. The trunnions at the reduced upper ends of the rollers are journaled in bearing-brackets 18, that are rigidly secured to the prongs of the pedestal-bearing 2. The trunnions at the lower ends of said rollers are journaled in bearings 19 on the pedestal 2, and are provided with intermeshing gears 20, and one of said trunnions is provided with a bevel-gear 21, that meshes with the pinion 15 of the shaft 14 before described. The conical ends 17ª of the rollers 17 are so located and related to the serrated edges of the feed-blades 5 that they will guide the butt-ends of the grass-blades which are fed laterally downward by said feed-blades between the contacting or coöperating surfaces of the said rollers. It will be noted that the bodies of the rollers 17 have greater diameter at their lower ends than at their upper body portions. This gives the said rollers greater peripheral speed at their lower ends than at their intermediate or upper end portions. The primary and secondary feed devices above described are of course applied to both of the bearing pedestals 2. The said secondary feed devices are disclosed and broadly claimed in my companion application, Serial No. 229,548, filed of even date herewith, entitled "Grass-twine machine." The secondary feed devices—to wit, the rollers 17—feed the grass-blades endwise into converging and inclined spouts 22, supported by the frame 1.

*Twine-forming mechanism.*—Rigidly held by bearings 23 of a bracket 24 on the frame 1 in axial alinement one with each of the diverging spouts 22 is a pair of non-rotary guide sleeves or tubes 25, which at their rearwardly-projecting ends are formed with threads 26, that constitute non-rotary worms. Spaced apart from but in axial line with each guide-sleeve 25 is another non-rotary guide-tube 27. These guide-tubes 27 are rigidly supported by bearings 28 on the bracket 24. Mounted to rotate on the guide-sleeves 25 and 27 is a pair of gear-carriers or supporting-frames 29. These gear-carriers 29 are thus mounted on axes that converge toward the rear of the machine, and on the forward hub of each is a sheave 30. A wedge-shaped anvil or divider 31 is rigidly supported just at the rear of the converging ends of the guide-sleeves 27, the same, as shown, being directly secured to the bracket 24.

In Fig. 7 the character z indicates one of the two twisted strands of grass which are to be twisted together to form the complete twine or rope. These strands pass through the alined sleeves 25 and 27, and as they are passing from the former to the latter they are engaged by and passed between a pair of coöperating peripherally-grooved drawing-wheels 32, the shafts 33 of which are mounted in the side plates of the carrier 29. The said shafts 33 carry intermeshing gears 34 and are directly journaled in bearing-boxes 35, that are slidably mounted in the side plates of the revolving carrier 29, and are subject to springs 35ª, which springs yieldingly press the draw-wheels onto the strands of the twine. The gears 34 mesh with gears 36, that are fixed on stub-shafts 37, journaled in the side plates of the carrier 29 and provided with worm-gears 38, that engage with the common worm 26 on the corresponding sleeve 25. With the worm-and-gear connections just described it is evident that when the gear-carrier 29 is rotated the draw-wheels 32 will be caused to revolve around the strands of the twine, thereby twisting the same, and will be caused to rotate on their own axes in the direction indicated by the arrows marked thereon in Fig. 7, thereby drawing the strands toward the rear of the machine. The said device is therefore a combined twister and drawing device. The two twisted strands of the twine after passing out of the guide-sleeves 27 enter a common centrally-located non-rotary sleeve 39, and from thence they are wound onto a reeling-spool and at the same time are twisted together by the rotary movement of the reeling mechanism.

*Reeling mechanism.*—A rectangular reel-frame 40 is mounted to rotate on the rear end of the non-rotary guide-sleeve 39 and on a stub-shaft 41, which shaft 41 is rigidly secured in a fixed bearing on the frame 1, is axially alined with said sleeve 39, and is provided on its forwardly-projecting end with a bevel-pinion 42. The pinion 42 meshes with a bevel-gear 43, which is carried by a counter-shaft 44, that is extended transversely of and loosely journaled in the revolving frame 40.

The numeral 45 indicates a windlass spool or drum onto which the completed twine is wound. This spool is preferably of the construction disclosed in my companion application, Serial No. 229,548, above identified. For the purposes of this case it is only necessary to state that it is mounted to rotate on bearings on the sides of the revolving frame 40 and is connected to rotate with a pair of small pulleys 46 and 47. A belt 48 runs over the pulley 46 and over a pulley 49, carried by the counter-shaft 44. A belt 50 runs over the pulley 47 and over a pulley 51 of a reversely-threaded rod 52, that extends transversely of the revolving frame 40 and is journaled on the sides thereof. The numeral 53 indicates a traveling reversible guide which works on the rod 52 and through which the twine is passed on its way to the spool 45. The said screw-rod 52 and traveling guide 53 operate as a deployer to spread out the twine layers on the windlass-spool. They are of standard construction, the operation of which is well understood, and hence further illustration is not necessary for the purposes of this case.

A long counter-shaft 54 extends longitudinally of the frame 1 and is journaled in suitable bearings on the lower portion thereof, as best shown in Fig. 8. This counter-shaft 54 carries driving-sheaves 54ª, 55, and 56. Motion may be imparted to the shaft 54 by any suitable means. (Not shown.) A cord belt 57 runs over the sheave 56 and over a sheave 40ª on one hub of the revolving frame 40 to impart motion to the latter. A cord belt 58 runs over the sheave 55, over the two sheaves 30 of the primary twisters, and over a guide-sheave 59, which is loosely mounted on a transverse beam of the frame 1. By this belt 58 motion is imparted to the rotating parts of the two primary strand-twisters. A cord belt 60 runs over the sheave 54ª, over the sheave 16 of the two crank-shafts 14, and over idle guide-sheaves 61 and 62, mounted, respectively, on bearing-brackets 63 and 64, rigidly supported by the frame-section 1ª.

*Operation.*—The grass, the blades of which are arranged approximately parallel, is placed in loose bundles in the depressions of the holder-plate 4 and with its butt-ends resting in the crotches afforded by the surfaces 7 of the feed-blades 5 and with the said butt-ends of the grass-blades projecting rearward over the conical ends 17ª of the rollers 17. Under the reciprocating movements imparted to the feed-blades 5 the blades at the bottom of the bundles will be directed to the serrated edges 6 of said feed-blades and by said serrated edges will be selected in a regular order of succession and fed vertically downward by lateral movement, as distinguished from an endwise movement. The conical ends 17ª of the rollers 17 will direct the butt-ends of the grass-blades between the opposing surfaces of the bodies of the rollers 17, and the said rollers upon taking hold of the grass-blades will feed the same endwise into the spouts or inclined troughs 22, by which they will be directed in two equal streams into the non-rotary guide-sleeves 25, between the coöperating drawing-wheels 32, and thence through the non-rotary guide-sleeves 27. As already pointed out, the grass-blades are twisted into strands and drawn rearward by the simultaneous rotary and revolving movements of the drawing-wheels, imparted thereto under the movement of the revolving carrier 29. The manner in which the two twisted strands are twisted together and wound upon the windlass-spool 45 under the rotary movement of the frame 40 has already been described.

The size of the strands of the twine—that is, the amount of grass twisted into each strand—may be varied by varying the relative feed of the primary feed device, afforded by the serrated feed-blades, with respect to the speed of the secondary feed device, afforded by the rollers 17, and, as already stated, this relative feed of the primary feed device may be varied at will by adjusting the opposing serrated feed-blades edgewise with respect to each other. The so-called "feed" blades or bars may of course take a great many different forms, and various devices may be employed for adjusting them with respect to each other so as to vary the amount of grass which they will take up and feed for each reciprocating movement. In my prior patent above identified no means whatever was provided for adjusting the feed-blades with respect to each other so as to vary their feeding action.

From what has been said it will be understood that the mechanism above described is capable of modification within the scope of my invention as herein set forth and claimed.

What I claim, and desire to secure by Letters Patent of the United States, is as follows:

1. In a machine of the character described, a feeding device comprising opposing blades or bars having coöperating serrated edges, and means for vibrating one or more of said blades or bars, to produce the feeding action, and a pair of coöperating rollers having surfaces that diverge from each other and are positioned to receive the grass-blades fed by said serrated blades or bars, and to direct them laterally between said rollers, the said rollers operating to feed said blades endwise, substantially as described.

2. In combination, opposing upright blades or bars, having coöperating serrated edges, means for vibrating one or more of said blades or bars, to produce a feeding action, and a pair of upright feed-rollers having upper end surfaces that diverge from each other and are positioned to receive the ends of the grass-blades fed thereto by said feed bars or blades, and to direct them between said rollers, said rollers operating to feed the grass-blades endwise, substantially as described.

3. In combination, a plurality of grass-holders, a plurality of primary feed devices, a plurality of secondary feed devices, a corresponding plurality of strand-twisters, and a common device for twisting together the several strands; said primary feeding devices comprising each a plurality of coöperating serrated feed blades or bars, and means for vibrating one or more thereof, to produce the feeding action; and said secondary feed devices comprising each a pair of coöperating rollers having end surfaces that diverge from each other and are positioned to receive the grass-blades from the corresponding primary feed device, and to direct the same between said rollers, under lateral movements, substantially as descrbied.

4. In a machine of the character described, the combination with opposing vertically-disposed feed blades or bars having coöperating serrated edges and diverging upper end surfaces, of means for vibrating one or more of said blades or bars, to produce the feeding action, a pair of coöperating upright feed-rollers geared together at their lower ends, and provided with conical upper ends, said conical ends affording a crotch for directing the grass-blades between said rollers as they are fed downward by said feed-blades, and twine-forming mechanism receiving the grass-blades from said rollers, substantially as described.

In testimony whereof I affix my signature in presence of two witnesses.

THOMAS W. JERREMS.

Witnesses:
ROBERT C. MABEY,
F. D. MERCHANT.